United States Patent
Feldman et al.

(10) Patent No.: US 8,880,591 B2
(45) Date of Patent: Nov. 4, 2014

(54) WORKFLOW MANAGEMENT IN DISTRIBUTED SYSTEMS

(75) Inventors: Michael Feldman, Edina, MN (US); Alexander Fiksel, Plymouth, MN (US); Harold James Mellen, III, Eden Prairie, MN (US); Robert Steven Barnett, Chanhassen, MN (US); Jeremy Wallace Johnson, Eden Prairie, MN (US); Vladimir Vialov, Maple Grove, MN (US)

(73) Assignee: Savigent Software, Inc., Minnetonka, MN (US)

( * ) Notice: Subject to any disclaimer, the term of this patent is extended or adjusted under 35 U.S.C. 154(b) by 553 days.

(21) Appl. No.: 13/077,174

(22) Filed: Mar. 31, 2011

(65) Prior Publication Data

US 2012/0254291 A1 Oct. 4, 2012

(51) Int. Cl.
*G06F 15/16* (2006.01)
*G06Q 10/06* (2012.01)

(52) U.S. Cl.
CPC ................................. *G06Q 10/06* (2013.01)
USPC .......................................... 709/203; 709/205

(58) Field of Classification Search
CPC ............ G06Q 10/06; G06Q 10/06311; G06Q 10/06312; G06Q 10/06313; G06Q 10/06315; G06Q 10/06316; G06Q 10/0633
USPC ................... 709/203–207, 229; 715/700–866
See application file for complete search history.

(56) References Cited

U.S. PATENT DOCUMENTS

| 7,242,991 | B2 | 7/2007 | Budinger et al. |
| 7,620,907 | B2 | 11/2009 | Resnick et al. |
| 7,707,550 | B2 | 4/2010 | Resnick et al. |
| 7,885,847 | B2 * | 2/2011 | Wodtke et al. ............... 705/7.26 |
| 2002/0007300 | A1 | 1/2002 | Slatter |
| 2002/0032692 | A1 | 3/2002 | Suzuki et al. |
| 2002/0052771 | A1 * | 5/2002 | Bacon et al. ...................... 705/8 |
| 2002/0194277 | A1 * | 12/2002 | Sakimura et al. ............. 709/205 |
| 2006/0020641 | A1 | 1/2006 | Walsh et al. |
| 2006/0026595 | A1 | 2/2006 | Nakayama et al. |
| 2006/0085245 | A1 | 4/2006 | Takatsuka et al. |
| 2009/0024432 | A1 | 1/2009 | Bauters et al. |
| 2009/0172671 | A1 | 7/2009 | Bobak et al. |
| 2009/0281865 | A1 | 11/2009 | Stoitsev |
| 2010/0306011 | A1 * | 12/2010 | Correll et al. ...................... 705/8 |

* cited by examiner

*Primary Examiner* — Phuoc Nguyen
*Assistant Examiner* — Davoud Zand
(74) *Attorney, Agent, or Firm* — Billion & Armitage; Michael A. Collins

(57) ABSTRACT

The workflow management system provides automatic management and execution of workflows that include both automated and user-driven actions. The system monitors connected external systems and/or users for the occurrence of events, which trigger the execution of one or more workflow plans. Each workflow plans consists of a plurality of actions and user actions to be performed in a sequential manner. Actions are executed automatically by the system, but user actions are executed asynchronously due to the inclusion of users in the workflow plan. The system handles the asynchronous nature of user actions by maintaining a pending user action database that users can access to view pending user actions, complete user actions, and reserve user actions for subsequent completion.

21 Claims, 11 Drawing Sheets

WORKFLOW MANAGEMENT IN DISTRIBUTED SYSTEMS

BACKGROUND

The present invention is related to automated workflow management systems and in particular to workflow management systems that incorporate user interactions A "workflow" is defined as consisting of a plurality of steps, executed in a particular sequence to achieve an outcome. Workflows are employed in a plurality of fields such as production control, document processing and service industries. For example, a workflow may be employed in a production facility to troubleshoot faults. In response to a detected fault, a technician would consult the workflow or action plan and follow the steps provided therein to troubleshoot the problem. However, a common problem with action plans is the inability to ensure that the user has actually performed the steps provided in the action plan. Oftentimes, users skip those steps which are deemed unimportant or redundant. Subsequent review of workflow execution may not indicate that these steps were skipped, or even who performed the steps.

Software based workflow management systems have been developed to improve the distribution and efficiency of workflow implementation. However, these software-based systems do not solve many of the problems associated with assurance of user performance, and accountability. In many instances, user interaction with workflow management systems consists of notifications provided to a user regarding user action required, without follow-up regarding whether the work has been performed.

SUMMARY

The system includes a data repository (e.g., database) for storing one or more workflow plans, each workflow plan consisting of a plurality of events, actions and/or user actions to be performed in an ordered manner. The system includes an event engine that monitors events generated by external systems and/or users communicating with the workflow management system and selects one or more of the stored workflows for execution based on monitored events. A plan engine included with the system executes the selected workflow plan, and maintains a pending user action database that stores pending user actions added to the database in response to execution of the workflow plan and removes pending user actions from the database in response to user completion of the user action. The system further includes a portal engine that communicates with the plan engine and a user via an external user interface, wherein the portal engine receives requests for pending user actions from the user, provides pending user actions retrieved from the pending user action database in response to a received request, and receives completed user actions from an external user interface communicating with a user.

DETAILED DESCRIPTION

The workflow management system of the present invention provides automatic management and execution of workflows that include both automated and user-driven actions.

Figure 1A:
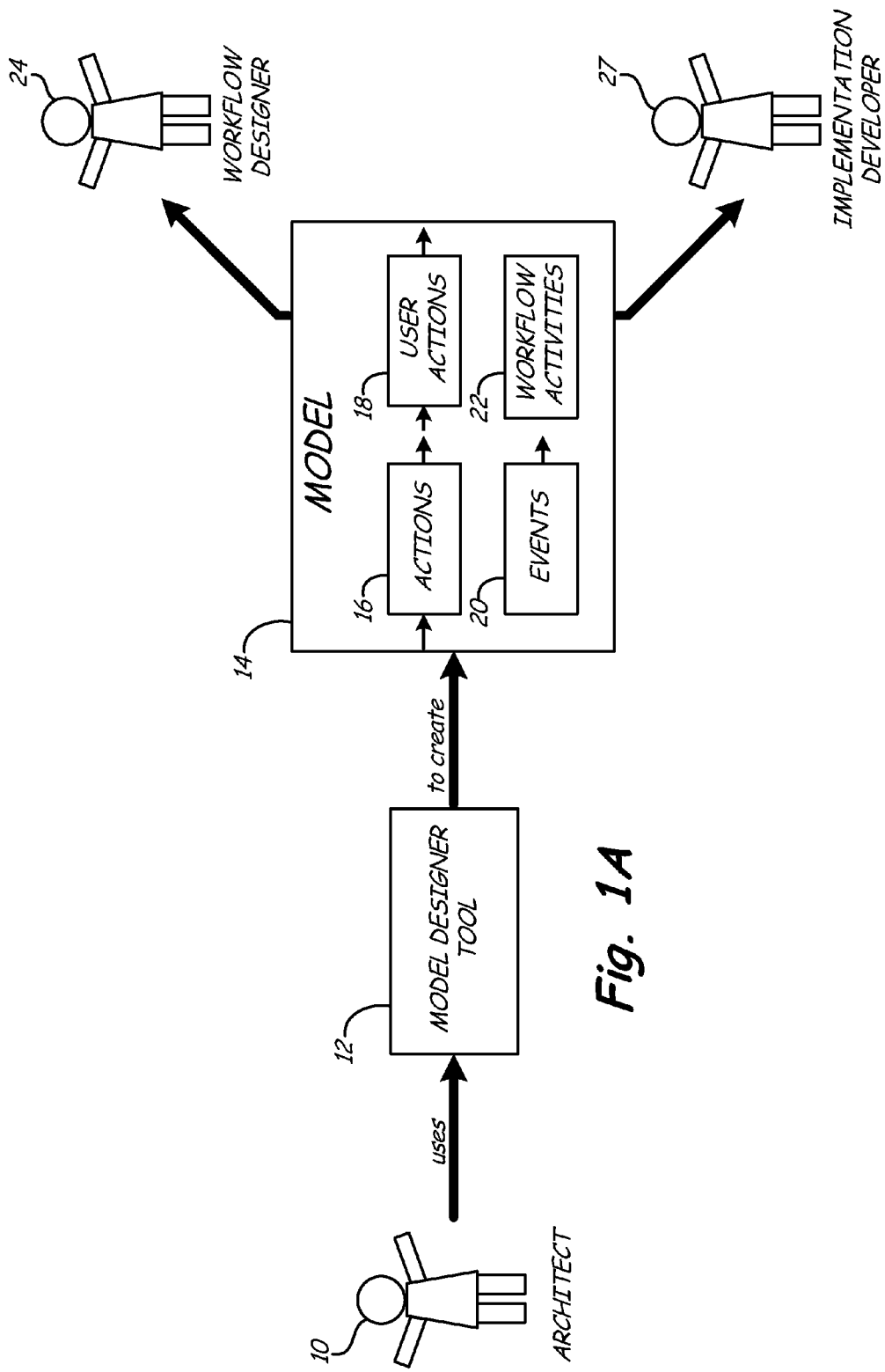
FIGS. 1A and 1B are block diagrams illustrating the design of a model, a workflow plan, and implementation details employed in a workflow management system according to an embodiment of the present invention.
Figure 1B:
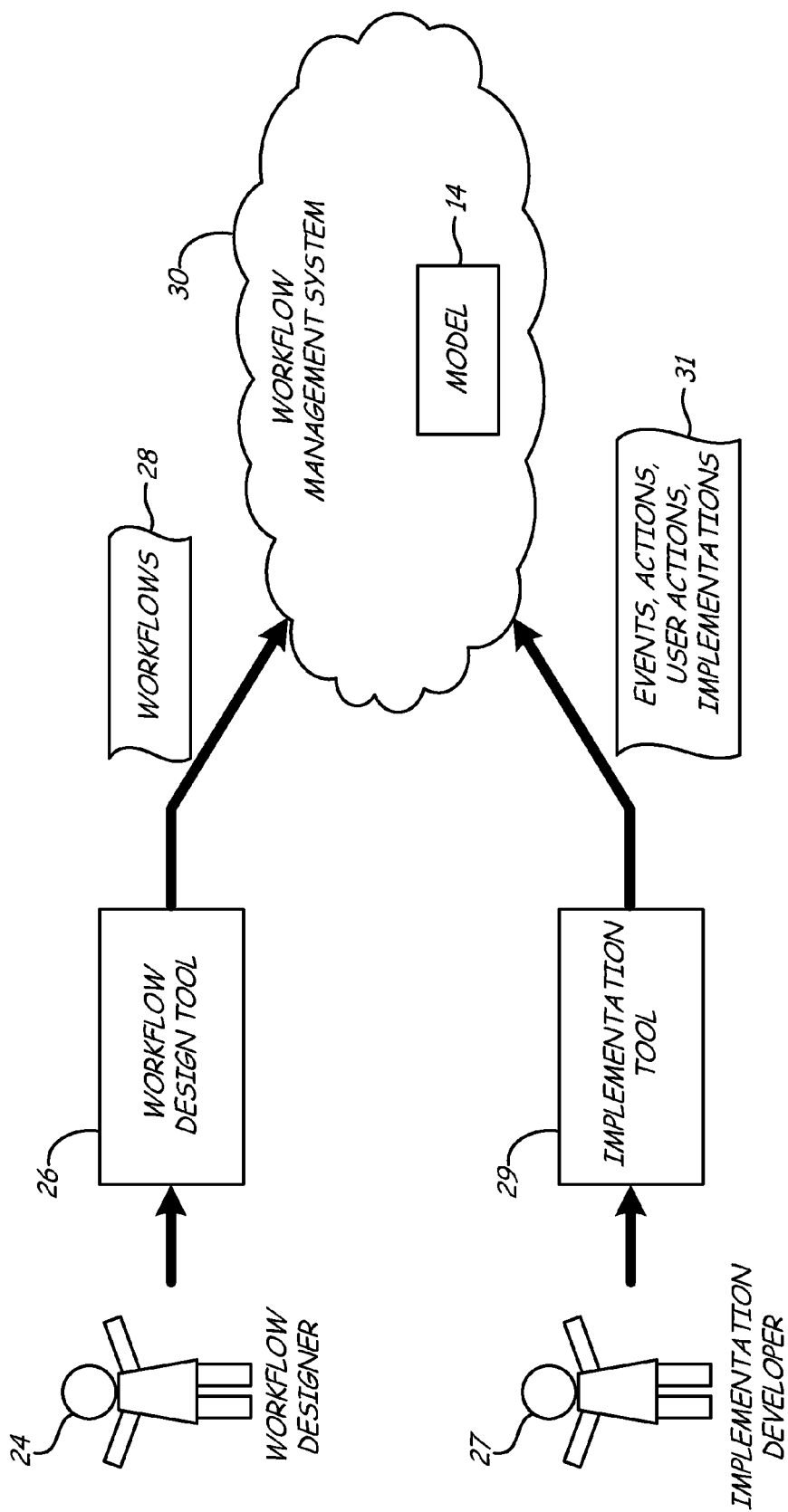

FIGS. 1A and 1B are block diagrams illustrating the design of a model, a workflow plan, and implementation details employed in a workflow management system according to an embodiment of the present invention.

In the embodiment shown in FIG. 1A, user architect 10 uses model design tool 12 to create model 14, which is comprised of elements or steps, instances of which can be organized into workflows in which instances of the elements or steps are performed in an particular order. The elements or steps (defined here as actions 16, user actions 18, events 20 and workflow activities 22) define the various interactions between external systems and users that will be subsequently employed by workflow developers for use in specific workflows. Model designer tool 12 is a software tool, loaded onto and executed by a computer system that provides an interface to the user designing the model. Model 14 is stored in a data repository (i.e., database) that is subsequently available to workflow designers 24 and/or implementation developers 27 working to design workflows and implement various interactions, respectively.

In the embodiment shown in FIG. 1A, the various steps or elements defined by model 14 are organized into one of the following categories: actions 16, user actions 18, events 20 and workflow activities 22 (generically, 'elements'), although other classifications of the various steps/elements are possible. The architect 10 seeks to capture in model 14 all possible interactions the workflow management system will have with external systems and with users. The actions 16, user actions 18, events 20 and workflow activities 22 defined by the architect 10 operate like contracts that define the external operation of each step or element. The workflow designer 24 connects the various elements together in a logical sequence based on the inputs/outputs defined by the architect 10 to form a workflow plan. The internal operation of each action, user action, events and/or workflow activity (i.e., the implementation of the steps/elements) is subsequently defined by implementation developer 27. For example, an action defining retrieval of information from a database may be defined by the architect 10 by the inputs passed to the action (e.g., part number) and outputs generated (e.g., information stored in the database with respect to the part number). Implementation of the action is subsequently defined by implementation developer 25 based on the particulars of the database to be accessed, etc.

Although other categorizations of the various steps or elements may be employed, for purposes of the description, the workflow management system is described with respect to the following elements.

FIG. 1B illustrates the roles of the workflow designer 24 and implementation developer 27 in creating workflow management system 30. In the embodiment shown in FIG. 1B, a workflow developer 24 uses workflow designer tool 26 and the elements defined by the model 14 to create workflow plan(s) 28. Workflow designer tool 26 is a software tool, loaded and executed by a computer system that provides an interface for a user to design the workflows. Designed workflow plan(s) 28 are stored in a data repository (i.e., database) that is subsequently made available for loading onto and execution by workflow management system 30.

In one embodiment, workflow designer tool 26 provides a visual user interface (shown in more detail with respect to FIG. 9) that allows a user to view available actions, user actions, events, and workflow activities) as defined by the architect 10 and stored as part of model 14. The visual user interface allows the user to visually select and connect actions, user actions, events and other workflow activities together in a given sequence to create a workflow.

FIG. 1B also illustrates the role of implementation developer 27 in implementing the various events, actions, user actions, and workflow activities defined by the architect 10 as part of model 14. If the actions, user actions, events and workflow activities created by the architect 10 represent the external operation of each element, the implementation created by the implementation developer 27 using implementation tool 29 represents the internal operation of the various elements. In one embodiment, implementation developer 27 employs Catalyst SDP™ System Development Platform, which provides a component-based platform for designing interactions with external systems and databases, to implement the various actions, user actions, events and workflow activities defined by model plan 14. In other embodiments, other development programs or software may be employed to implement the various actions, user actions, events, and workflow activities defined by model plan 14. For example, user actions may be implemented with respect to various user interfaces (e.g., WinForms applications, HMIs, third party applications, tablets, phones, smart scanners, etc), and implementation may be provided with respect to one or more of these systems.

In addition, each particular action, user action, event, etc. may include a plurality of implementations. There are a variety of circumstances in which different implementations of the same action, user actions, etc. is beneficial. For example, in a factory in which three stations are mixing three different recipes, the architect 10 may create an action in model 14 called 'load recipe'. This action may be employed generically as part of one or more workflow plans. However, when executed with respect to the first station, the implementation of the action should be different than the implementation of the same action on the second station. The implementation developer 27 would therefore create three separate implementations of the action 'load recipe', one for each of the three stations. A label may be associated with each implementation that identifies the station with which the implementation is associated. As a result, when a workflow is executed that includes executing the action 'load recipe', an action engine (shown in FIG. 3) responsible for executing actions executes the correct implementation based on the station on which the action is being executed. A benefit of this arrangement, is generic actions can be created by the architect 10, and used by the workflow designer 24 without knowledge of the implementation details provided by the implementation designer 27. In particular, once the architect 10 has created the various elements/steps to be included in model 14, the workflow designer 24 can be generating workflows even while the implementation designer 27 is still developing various implementations.

Having defined workflow plans 28 and defined implementations of the various actions, user actions, events and workflow activities included within workflow plans, the plans are made available to workflow management system 30 for loading and execution. As described in more detail with respect to FIG. 3, workflow management system 30 monitors events and loads/executes workflow plans in response to detected events. Execution of workflow plans involves sequential execution of the various actions, user actions, and other workflow activities described by a given workflow plan. Workflow management system executes actions, queues user actions for a user to view and complete, tracks and triggers timeouts, handles and reports execution errors, and captures deployment and execution history of deployed models (i.e., tracks changes to deployed models), workflow plans (i.e., tracks changes to deployed actions plans), actions and events (i.e., captures and stores a history of events and actions taken in response.

Event

Events represent those interactions with external systems and/or users that will be used to trigger various workflow plans. All workflow plans are triggered by the occurrence of an event, although events may also be included within workflow plans to pause execution of the workflow until an event is detected.

In one embodiment, the architect 10 creates an event by naming the event and identifying the output generated by the event. That is, the architect 10 defines the external operation of the event (i.e., the output created by triggering of the event), without specifying the implementation of the event. The event, once created, may be employed in workflow plans by workflow designer 24 even before the implementation of the event has been created by implementation developer 27.

Events defined by the architect 10 can be thought of as essentially a one-way message sent from a provider (device, system or person triggering the event) to a consumer (workflow management system handling the event), the occurrence of the event triggering some action (i.e., execution of a workflow). In one embodiment, events defined by architect 10 using model design tool 12 are defined as having an output and a result code. The output is stored by the workflow management system, and can be used as an input to a subsequent action or user action. A benefit of the data storage associated with workflow management system, is the output provided by a particular event may be provided as an input to an action called many steps later. That is, the output is not just provided as an input to the next action or user action, but may be provided as an input to any action or user action in the workflow.

The inclusion of result codes in events (as well as actions and user actions) provides a means for dictating the next step or element to be performed in a particular workflow (i.e., logical execution of workflow activities). That is, results codes allow for workflow triggering and branching without special logic or code to make a branching decision. For example, the result code can be used to determine which operation should be performed next in a workflow (e.g., if result code is 'true' then perform action 'A', if result code is 'false, then perform user action 'B'). A benefit of result codes is it obviates the need for detailed if-then type statements following execution of each action, user action, event, etc.

Events may be triggered by systems, devices, or user. For example, an event may be triggered by a fault or error code generated by a particular machine or device, by users of the system, or by enterprise systems such as quality management systems, maintenance management system, etc. Examples of the types of events generated include the start of a new shift within a scheduling system, a maintenance request for a machine or device, an operator request for assistance, fault code generated by a device, etc. In response to received notification of this event from an external system, the workflow management system will locate and execute the appropriate workflow plan.

Action

An action represents an automatic operation that does not directly depend on any user input or interaction. Actions may receive inputs as well as provide outputs. Inputs and outputs of the action are available to any other action or user action in the workflow. In addition, actions are defined by a result code (e.g., true, false) that dictates the next action performed in the workflow.

For example, in response to an event indicating detection of an out-of-range value in a particular piece of equipment, the action plan may include an action for retrieving the batch number in which the out-of-range value was detected, or an action that stops or starts equipment. Workflow management system communicates the action required and receives a response without interaction from a user.

In one embodiment, the architect 10 creates an action by naming the action and identifying the inputs passed to the action and the outputs generated by the action. In this way, the architect identifies the external operation of the action, without specifying the implementation of the action. The architect 10 also identifies result codes that may be returned by the action. The result codes being used to by workflow designers to dictate the next step or element to be performed in a particular workflow (i.e., triggering and branching of workflows without the need to include special logic or code to make the branching decisions).

Implementation of the actions is provided by implementation designer 27. As described above with respect to events, a generic action defined by the architect 10 may include a plurality of implementations. Each implementation may be defined by a label that identifies the external system, device, computer node responsible for execution of the action. In this way, a generic action employed in a workflow may have different implementations depending on the external system, device, node executing the action.

User Action

Like an action, a user action is defined as an operation of the workflow. A user action may accept inputs and provide outputs. However, in contrast with actions, user actions represent interactions with users. These operations, by definition, are performed asynchronously because users are not always available to perform user actions immediately. User actions are further defined by a role specifying who is eligible to complete a particular user action, and one or more escalation roles that indicates who is eligible to complete a particular user action if the user action is escalated in status (e.g., if not performed with in a certain amount of time, the user action may be escalated).

The architect 10 creates a user action by naming the user action, identifying inputs passed to the user action and outputs received from the user action. The architect 10 also specifies result codes associated with the user action. The architect 10 does not specify the implementation of the user action. However, once created, the user action may be incorporated into workflow plans by workflow designer 24 even before the implementation of the user action has been created by implementation developer 27.

Implementation of the user actions is provided by implementation designer 27. As described above with respect to events and actions, a generic user action defined by the architect 10 may include a plurality of implementations as designed by the implementation developer 27. In this way, a generic action employed in a workflow may have different implementations depending on the external system, device, node executing the user action. For example, one implementation of a user action may be specific to an application used to communicate the user action to a user. Another implementation of the same user action may employ a SharePoint Portal Server to communicate the user action to a user. In this way, the user action is generic (e.g., respond 'yes' or 'no' to a request), but the specific details regarding the implementation of the user action is specific, and may be adapted to a plurality of different implementations.

In addition, by defining user actions within the model of the workflow management system allows the actions of users to be included as part of implemented workflows. This provides benefits over systems that may send notifications to users to do something, but do not allow actions of the user to be included as part of the automated workflow.

Other Workflow Activities

Workflow system defines additional types of steps or activities that may be included in the workflow to implement desired functionality. Unlike events, actions and user actions, workflow activities are internal to the workflow system and are executed synchronously by the workflow system. Examples of workflow activities include data actions, decisions, error handlers, join, terminal activities, and logical elements. Data actions are used by the workflow to perform calculations/manipulations of inputs and outputs of any workflow activity. Decisions are used to branch workflow execution in cases when simple result codes do not provide enough information to do so. Error handlers allow the workflow system to handle an exception and execute necessary logic to recover. Join activity allows for multiple branches of the workflow to combine into one outgoing transition. Terminal activity can only have incoming transitions and is the last activity executed by a workflow instance.

To summarize, the architect 10 uses the model design tool to define events, actions and user actions. The workflow designer 24 using workflow design tool 26 uses the events, actions, and user actions, defined in model 14 and workflow activities to create workflows, and the implementation developer 27 uses the implementation tool 29 to implement the various events, actions and user actions defined in the model 14.

Figure 2:
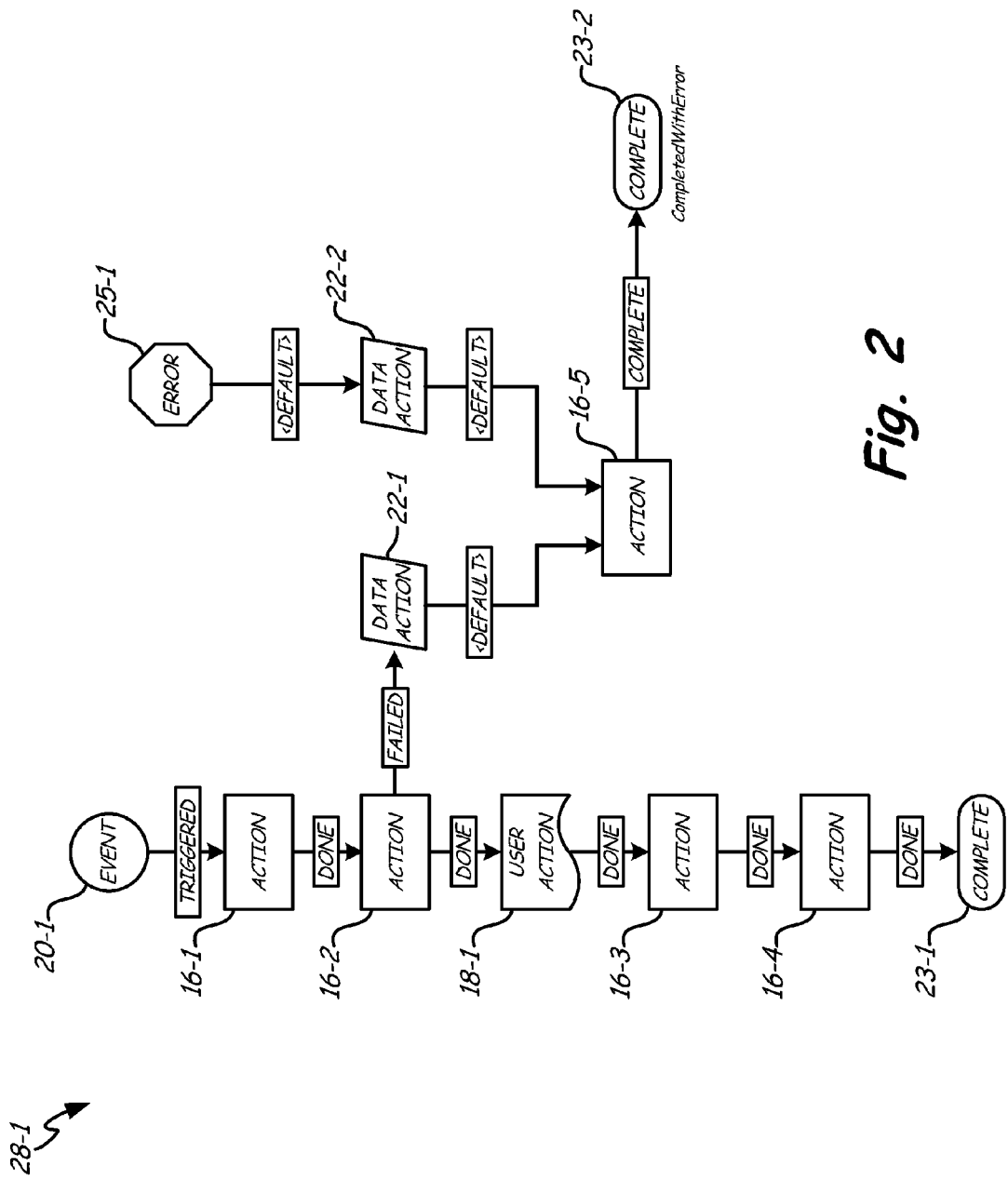
FIG. 2 is a visual display/screenshot of a workflow plan created using the workflow design tool according to an embodiment of the present invention.

FIG. 2 is a visual display/screenshot of exemplary workflow plan 28-1 designed by the workflow developer 24 using workflow design tool 26 according to an embodiment of the present invention. A benefit of the visual display provided by workflow design tool 26 is that it is easy for the designer to visualize the sequence in which various interactions (e.g., actions and user actions) will be implemented. The sequence of execution of the various elements being defined by the order in which they are connected to one another.

In the embodiment shown in FIG. 2, action plan 28-1 includes event 20-1, actions 16-1, 16-2, 16-2, 16-4, 16-5, and 16-6, user action 18-1, and data actions 22-1 and 22-2. Action plan 28-1 also includes error handler 23-1 and terminal activities 25-1, 25-2.

Inclusion of event 20-1 indicates that detection of this event is necessary to trigger the workflow plan 28-1. In response to detection of event 20-1, workflow management system 30 performs actions and user actions in the order dictated by workflow plan 28-1. Performance of a subsequent action, user action or other workflow activity action only occurs when performance of a previous element has completed. In the embodiment shown in FIG. 2, lines connecting various elements are defined by result codes that must be returned by the particular element before execution of the next element can occur. For example, the line connecting action 16-1 to 16-2 is labeled 'Done,' which requires that action 16-1 be completed and return a result code value of "Done" before action 16-2 is executed by workflow system 30. With respect to action 16-2, the action can return a value of "Done" or "Failed," with the returned value dictating whether execution of workflow plan 28-1 proceeds with the execution of user action 18-1 or data action 22-1.

Successful execution of action 16-2 (e.g., "Done" value returned) is followed by a request for user action 18-1. As described in more detail below with respect to FIG. 3, because users do not respond to requests immediately, the user action is added to a pending user action database that is made available for users to view. From the list of pending user actions stored in the pending user action database, a user can select a user action (e.g., user action 18-1) to complete. Execution of workflow plan 28-1 does not proceed until user action 18-1 has been completed (i.e., "Done" value returned). In this way, workflow management system 30 incorporates user actions into workflow execution. Mechanism may be included (e.g., timeouts, error-handler instances) to account for unusual user delays in performing a user action.

Successful execution of user action 18-1 is followed by subsequent execution of actions 16-3 and 16-4. Workflow plan 28-1 terminates following execution of action 16-4, as defined by completion event 25-1. In response to workflow plan 28-1 being completed (without errors), workflow management system 30 stores data regarding the execution history of workflow plan 28-1.

In addition, workflow plan 28-1 includes additional actions to be taken in response to an error or inability to execute one of the actions (in this case, action 16-2). For example, in response to a failed attempt to execute action 16-2, the execution of workflow plan 28-1 proceeds to data action 22-1, rather than user action 18-1. For example, data action 22-1 may be a request to record in a database the failed attempt to execute action 16-2. Data action 22-1 is followed by execution of action 16-5. In this example, the term 'default' describes the progression from data action 22-1 to action 16-5. This indicates that progression of the workflow from data action 22-1 to action 16-5 continues regardless of whether data action 22-1 is successfully performed. Following execution of action 16-5, workflow plan 28-1 terminates with completion event 23-2. For example, completion event 23-2 may indicate that workflow plan 28-1 has been executed with errors.

Error handler 25-1 is called in response to other errors that occur during execution of workflow plan 28-1. For example, error handler 25-1 may be called in response to a timeout error associated with execution of a particular action or user action. In response to error handler 25-1 being called, the execution of workflow plan 28-1 continues with the execution of data action 22-2. Once again, progression from error handler 25-1 to data action 22-2 is labeled 'default', meaning that execution of data action 22-2 is performed regardless of the state of execution of error handler 25-2. Similarly, action 16-5 is executed regardless of the state of execution of data action 22-2. The embodiment show in FIG. 2 is exemplary and other workflow plans may employ different combinations of actions, user actions, events and other actions.

In the embodiment shown in FIG. 2, only one action, user action, event or workflow activity is performed at a time, although in other embodiments, a plurality of elements may be defined to operate in parallel.

Figure 3:
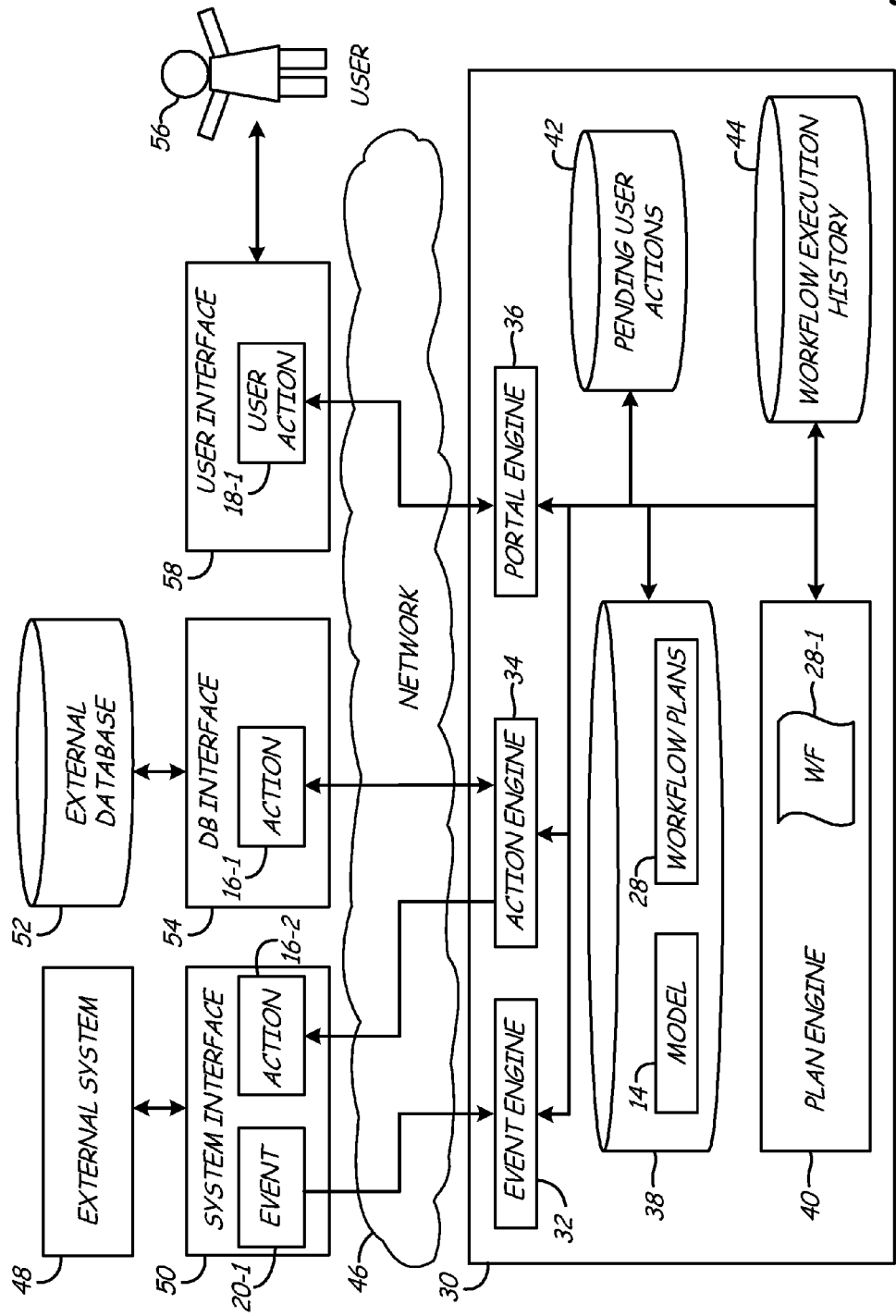
FIG. 3 is a functional block diagram illustrating execution of the workflow management system and interaction between various components of the workflow management system according to an embodiment of the present invention.

FIG. 3 is a functional block diagram illustrating execution of a created workflow plan by the workflow management system and interaction between various components of the workflow management system according to an embodiment of the present invention.

In the embodiment shown in FIG. 3, workflow management system 30 includes event engine 32, action engine 34, portal engine 36, database 38 for storing model 14 and action plans 28, plan engine 40, pending user action database 42, and execution history database 44. Workflow management system 30 is connected to communicate with external systems and users via network 46. Workflow management system 30 communicates via network 46 with external system 48 via system interface 50, with external database 52 via database interface 54, and with user 56 via user interface 58.

In one embodiment, event detection and actions performed by system interface 50 and database interface are implemented with the Catalyst SDP™ System Development Platform, which provides a component-based platform for designing interactions with external systems and databases. In the embodiment shown in FIG. 3, system interface 50 would include a plurality of SDP components that define the various actions and events associated with external system 48. For example, system interface 50 may be designed to communicate with a particular production machine, in which system interface 50 receives data associated with the production process. In response to the data indicating an out-of-process event, system interface 5 generates event 20-1.

In the embodiment shown in FIG. 3, model 14 and workflow plans 28 (designed as described with respect to FIGS. 1A and 1B, respectively) are stored in database 38. Event engine 32 monitors/receives event notifications generated by external systems and/or users. In response to received/detected events, event engine 32 determines the appropriate workflow plan to be loaded and executed. In one embodiment, event engine 32 employs a look-up table to determine the workflow plan or plans to be loaded with respect to a detected event. In other embodiments, event engine 32 provides detected events to plan engine 40, which is responsible for locating and loading the appropriate workflow plan in response to the received event.

Plan engine 40 loads and executes an instance of the workflow plan selected by event engine 32 based on a received event. Plan engine 40 manages the execution of actions, user actions and data actions included within a workflow plan, by sequentially passing actions and data actions to action engine 34 and user actions to portal engine 36. A benefit of workflow management system 30 is instances of workflow plans are executed independent of one another. Therefore, multiple instances of the same workflow plan may be loaded and executed at the same time by plan engine 40.

Action engine 34 provides for the execution of actions called in a workflow plan. The execution and performance of actions by action engine 34 is asynchronous. In one embodiment, action engine 34 handles the asynchronous performance of actions by starting a timer when the action is initiated, and aborting execution of the action if not completed within a timeout period defined by action engine 34 or by the action being performed. If execution of the action is aborted, a result code is generated indicating failed execution of the action. The error code may be handled within the workflow plan, wherein the workflow plan includes a workflow path to handle the failed execution result code. In other embodiments, the workflow plan does not provide for failed execution of actions, so execution of the workflow is suspended by plan engine 40. In some embodiments, the plan may be restarted via a management console (not shown) or user input.

In addition, action engine 34 is responsible for controlling the concurrent execution of an action implementation (i.e., identical action implementations, called multiple times within a workflow or called independently by separate workflows). For some actions, concurrent execution of multiple actions may be allowed, while other actions may only allow single invocation of the action at a time. For example, implementation of the action may access an equipment interface that can only support one communication exchange at a time. In other cases action implementation doesn't incur such limitation and multiple, concurrent invocations are allowed.

Implementations of actions may be deployed and executed on the same computer node responsible for executing action engine 34, or may be deployed and executed to remotely located nodes (e.g., distributed), wherein action engine 34 executes the action implementations via a connection to network 46. As discussed above, a particular actions, user actions, etc. may have a plurality of implementations. For example, an action called 'load recipe' may have a first implementation associated with a first workstation, and a second implementation for a second workstation. Each implementation may be assigned a different label, such as a nodes label identifying the node on which the particular implementation should be used that differentiates the implementation from other implementations of the same action, user action, etc. Action engine 34 employs the label to invoke the correct implementation, whether the implementation is performed on the same computer node as action engine 34, or whether the implemented action is located on a different node. This functionality allows a generic action (e.g., load recipe) to be implemented differently at different locations or computer nodes. A benefit of having a plurality of implementations is the architect 10 (shown in FIG. 1) can generate a single action, user action, etc, and workflow designer 24 can generate workflow plans based on the generic action, user action, etc, thereby simplifying workflow design.

Plan engine 40 also interacts with pending user action databases to manage and store pending (i.e., pending, but not assigned) user actions and with workflow execution history database 44 to store information regarding the execution of workflows. Benefits of the interaction between plan engine 40 and workflow execution history database 44 include improved scalability and fault tolerance of workflow management system 30. Scalability refers to the number of workflow plans that may be executed simultaneously by plan engine 40. Storing information related to partially executed workflow plans allows plan engine 40 to remove from memory (not shown) or unload a particular workflow plan that does not require immediate processing. For example, a workflow plan in which the next action is a user action, may not need further processing for several hours or days. Storing information associated with the partially executed workflow plan allows plan engine 40 to unload the workflow plan until the user action (or some other event, time-out, etc.) occurs, at which time the partially executed plan stored in workflow execution history database 44 is reloaded into plan engine 40 for further execution. In addition, the transactional nature of the workflow execution history database 44 provides fault tolerance in the event of a workflow management system fault. Information stored in workflow execution history database 44 can be used to restore operations following a fault condition.

In an exemplary embodiment of workflow plan execution, the system monitors KPI data from a critical pump (e.g., temperature, vibration, pressure drop) for deviations from normal operation. Upon the occurrence of a deviation, system interface 50 (responsible for monitoring the KPI data) initiates an event, which is communicated via network 46 to event engine 32. In response to the received event, event engine 32 selects workflow plan 28-1 for loading into plan engine 40.

In this example, workflow plan 28-1 requires a check of an external database to retrieve a repair record associated with the pump (e.g., action 16-1), followed by a request to an engineer to verify operation of the pump (e.g., user action 18-1), and then automatic re-start of the pump (e.g., action 16-2). Plan engine 40 communicates action 22-1 to action engine 34; and action engine 34 communicates action 16-1 to database interface 54 for execution of the action. In this example, database interface 54 accesses external database 52 to retrieve the requested record, returns the record to database interface 54, which in turn communicates via network 46 with action engine 34. Upon receipt of the information, action engine 34 communicates the record to plan engine 40. Execution of workflow plan 28-1 by plan engine 40 does not proceed until action engine 34 indicates that action 16-1 has been completed.

Upon receiving notification from action engine 34 that action 16-1 has been completed, plan engine executes the next interaction in workflow plan 28-1, in this example, user action 18-1. Plan engine 40 communicates user action 18-1 to pending user action database 42, which identifies and stores all pending user actions. Because users cannot be required to perform a particular action immediately (i.e., the performance of assigned actions is asynchronous), plan engine 40 stores pending user actions in database 42. Pending user actions represent those actions that have been scheduled (i.e., called by the plan engine) but not yet started.

Users access pending user action database 42 to view pending user actions, select user actions to complete, reserve user actions for subsequent completion, or cancel user actions the user had previously started. Once a pending user action has been started, a particular user is associated with the user action and the user action is removed from pending user action database 42. Once started, the user may return the started user action to a pending state, in which case the pending user action is returned to pending user action database 42. In one embodiment, user actions are not removed from pending user action database until complete, even if a user action has been started by a user. However, in this embodiment, started user actions would not be displayed to other users as pending.

In addition to selecting a pending user action for completion, a user may reserve a pending user action for subsequent completion. Reserving a pending user action prevents other users from completing the user action. A reserved, pending user action may be removed from pending user action database 42 or may be maintained in user action database 42 with a marker indicating that the user action has been reserved by a particular user. In this way, subsequent requests by other users for pending user actions are not provided with reserved user actions. A user may subsequently unreserved a pending user action, resulting in the user action being returned to pending user action database 42, or the marker identifying the pending user action as reserved is removed. In this way, other users are able to view and complete the user action.

Pending user actions may be assigned to a particular user, or a group of credentialed users. When accessing pending user action database 42, a user is displayed a list of pending user actions matching the identification of the user, or matching credentials associated with the particular user. A notification may be sent to a selected user or credentialed set of users regarding a new pending user action, but this is not required. If a user action is not completed within a defined period of time, the user action may be escalated and assigned to a different user(s) with different credentials, in which case the user action would be returned to pending user action database 42. In this way, the present invention provides a framework for dealing with the asynchronous aspect of user interactions.

Portal engine 36 communicates user actions via network 46 to user interface 58. In one embodiment, users access network 46 and workflow management system 30 via a web service or portal. In other embodiments, user interface 58 may be implemented with other technologies capable of providing communication between a user and computer system, including applications such as WinForm applications, HMIs, third party-applications, tablets, phones, smart scanners, etc. In the embodiment shown in FIG. 3, user interface 58 is implemented and deployed within the Microsoft SharePoint portal, which allows users to interact with the system via an intuitive web portal. In particular, portal engine 36 provides a page/display that displays pending user actions and allows the user to interact with pending user actions. As discussed above, pending user actions may be displayed based on the identity of the user, the credentials associated with the user, and assignment of various user actions to the user. Through the pending user action display provided by user interface 58, a user selects user actions to complete and/or reserve. The user may also be able to sort pending user actions based on various criteria, including time assigned, priority, etc.

Continuing the example, user 56 receives user action 18-1 and takes action to complete the task and verify completion in a communication provided to plan engine 40 via portal engine 36. In response to the completion of user action 18-1, plan engine 40 removes user action 18-1 from the list maintained by pending user action database 42 and continues the execution of workflow plan 28-1. In this example, plan engine 40 communicates action 16-1 to action engine 32, which provides the action to system interface 50 for execution. Following completion of the last action in workflow plan 28-1, the plan can be removed from plan engine 40.

Throughout execution of workflow plan 28-1, and other workflow plans, plan engine 40 stores data relevant to the execution of the workflow to workflow execution history 44. For example, information may include information about the workflow plan executed, the time the plan was executed, the user responsible for executing specified user actions, input and output data passed to various actions and user actions, etc. This information may be used in subsequent portions of the executed workflow, or be retrieved and reviewed after execution of the workflow to determine which workflows were executed, who executed them, etc. In this way, work plan management system provides traceability and accountability regarding the performance of workflows. For example, manufacturing intelligence systems may review execution of various workflow plans, including execution of individual actions, user actions, etc. for possible improvements. The storage of data associated with execution of each workflow plan, including information such as timestamps associated with execution of various actions, user actions, etc is useful in identifying problems with a particular process or workflow.

Figure 4:
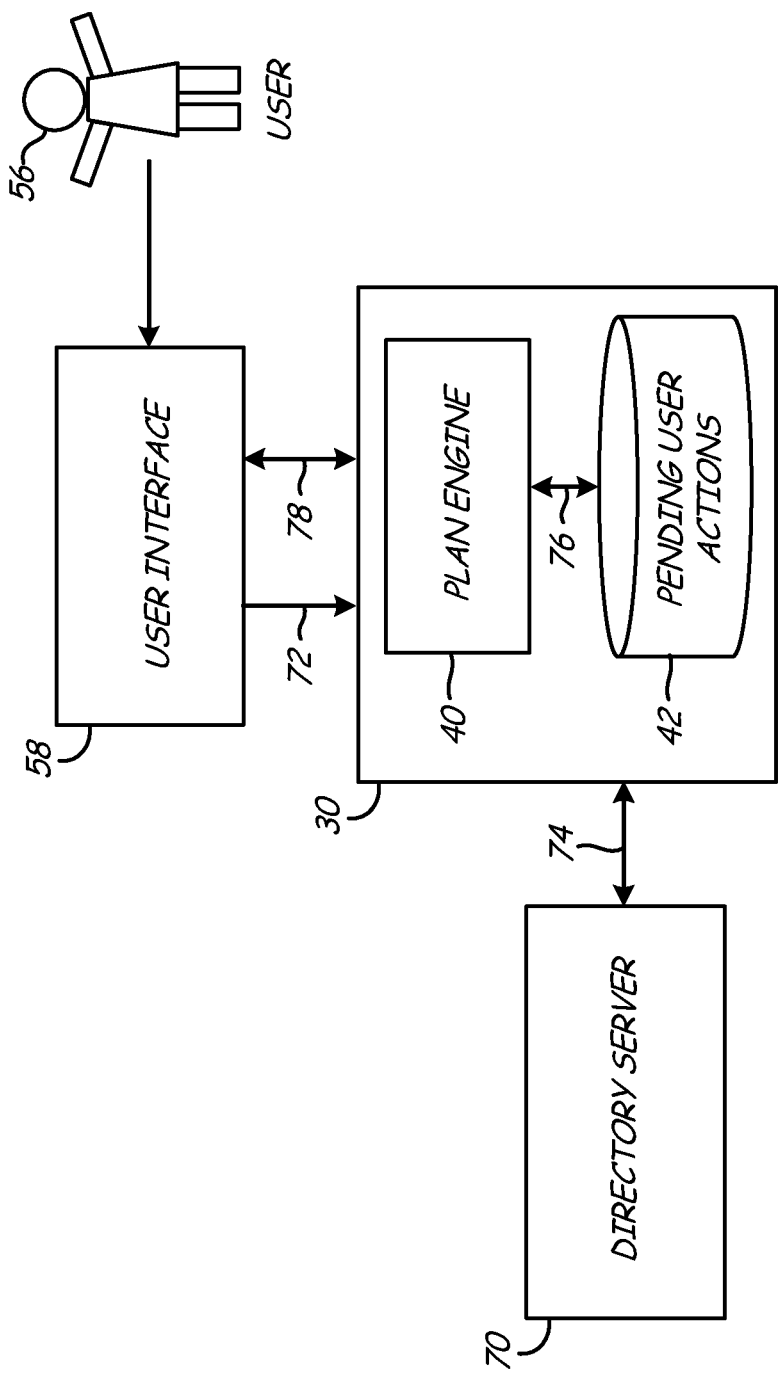
FIG. 4 is a functional block diagram illustrating communication between a user and workflow management system to retrieve pending user actions according to an embodiment of the present invention.

FIG. 4 is a block/flow diagram illustrating user interaction with workflow management system 30 according to an embodiment of the present invention. In particular, the embodiment shown in FIG. 4 illustrates how user actions are assigned to an individual user according to an embodiment of the present invention. In some embodiments, assignment of user actions may be specific to particular users. However, in many large organizations, a number of users with the same or similar credentials are capable of performing various classes of user actions. For example, a production facility may employ a number of technicians for operating machines, a number of engineers to monitor and ensure proper operation of the machines, and one or more managers. A user action requiring a technician to review the configuration of a particular device could be generated for a particular technician, but it would also be generated for all users with the necessary credentials to verify operation of the machine. A technician accessing the workflow management system requests to view all pending user actions, and may then select those that he will perform.

In the embodiment shown in FIG. 4, user 56 employs user interface 58 to interact with workflow management system 30. In this example, user 56 requests at step 72 a list of pending user actions. Workflow management system 30 receives the request, and at step 74 sends a request to external directory server 70 for user information. That is, workflow management system 30 requests information regarding the credentials associated with a particular user (e.g., technician, engineer, etc.). In other embodiments, this information may be loaded and maintained within workflow management system (i.e., workflow management system maintains a database of all users and the credentials associated with each user).

At step 76, based on the user/credential information provided by directory server 70, plan engine 40 requests a list of all matching user actions from pending user action database 42. This may include user actions specified for particular users as well as user actions specified for a particular class of credentialed users. In response to the request, pending user action database 42 supplies a list of requested user actions, which at step 78 are supplied to user 56 via user interface 58. In some embodiments, user 56 is expected to complete all user actions provided by workflow management system. In other embodiments, user 56 reviews pending user actions and selects those actions for which the user takes responsibility. Indication of the selected user actions is provided to workflow management system 30, which updates pending user action database 42 with the assignment of user actions to a particular user. As a result, subsequent requests for pending user actions by different users will not result in the pending user actions assigned to user 56 being returned. Pending user actions may be removed from pending user action database 42 upon assignment to a particular user, or may be maintained in pending user action database 42 until the user completes the action.

Through the maintenance of pending user action database 42 by workflow management system 30, a user is able to request a list of pending user actions and select particular user actions for completion. Rather than view all pending user actions, user 56 may request a list of all user actions which have been assigned to the user, either by the user or by other users (e.g., managers). This request does not require a look-up of credentials from directory server 70, only a review of pending user actions stored in pending user action database 42.

In addition, having completed a user action, user 56 may request retrieval of a subsequent user action (if any) from a particular workflow. This is useful in workflows that require a plurality of user actions. Rather than a user completing a first user action, and then waiting for subsequent user actions to be added to pending user action database 42 for the user to search and locate, this feature allows a user to retrieve subsequent user actions associated with a particular workflow.

Completion of a user action by user 56 is communicated to workflow management system 30 and plan engine 40, which removes the completed user action from pending user action database 42. As part of the removal process, plan engine 40 may record (i.e., in workflow execution history database 44 shown in FIG. 3) completion of the user action, including the user that completed the action.

Figure 5:
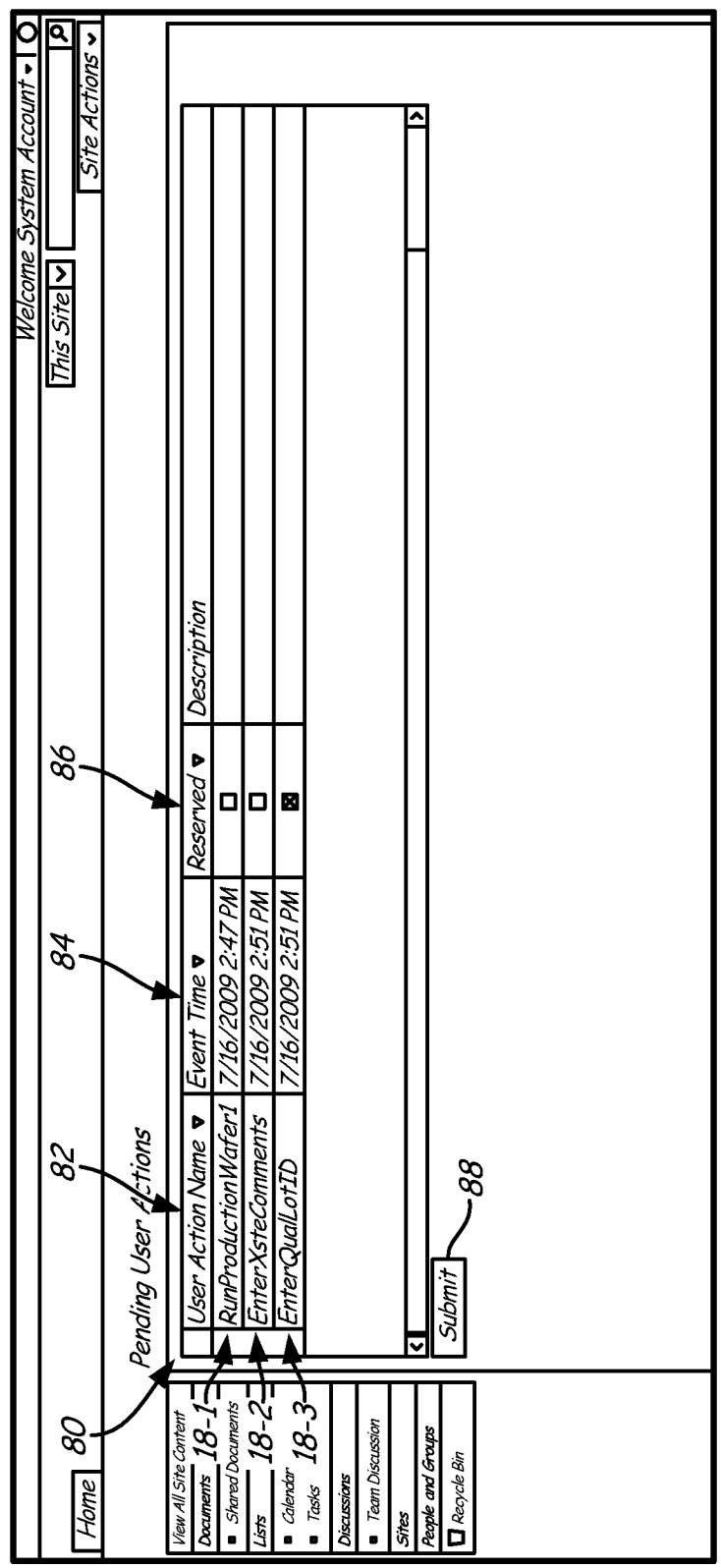
FIG. 5 is a screenshot of a pending user action window displayed to a user according to an embodiment of the present invention.

FIG. 5 is a screenshot of pending user actions displayed to a user in response to a request for pending user actions according to an embodiment of the present invention. In the embodiment shown in FIG. 5, pending user actions are displayed in pending user action window 80. Pending user actions are displayed as records, with each user action record provided in a separate row. In the example shown in FIG. 5, returned user actions include user actions 18-1, 18-2 and 18-3. Each record includes identifying information with respect to the returned actions, including User Action Name 82, Event Time 84, Reserve Status 86, and Description 88. User Action Name describes the user action to be performed. Event Time indicates the time that the user action event was called by workflow management system 30. Reserve Status includes a checkbox for receiving input from the user, allowing the user to indicate responsibility for a particular user action. In the example shown in FIG. 5, the user checks the box associated with user action 18-3, indicating that the user will be responsible for completing this user action.

Having selected the user actions for which the user wants responsibility, the user submits the selection to workflow management system 30 using Submit button 82. This does not complete the user action. However, selected user actions may be indicated as such in pending user action database 42 to prevent the action from being displayed to other users for assignment.

Figure 6:
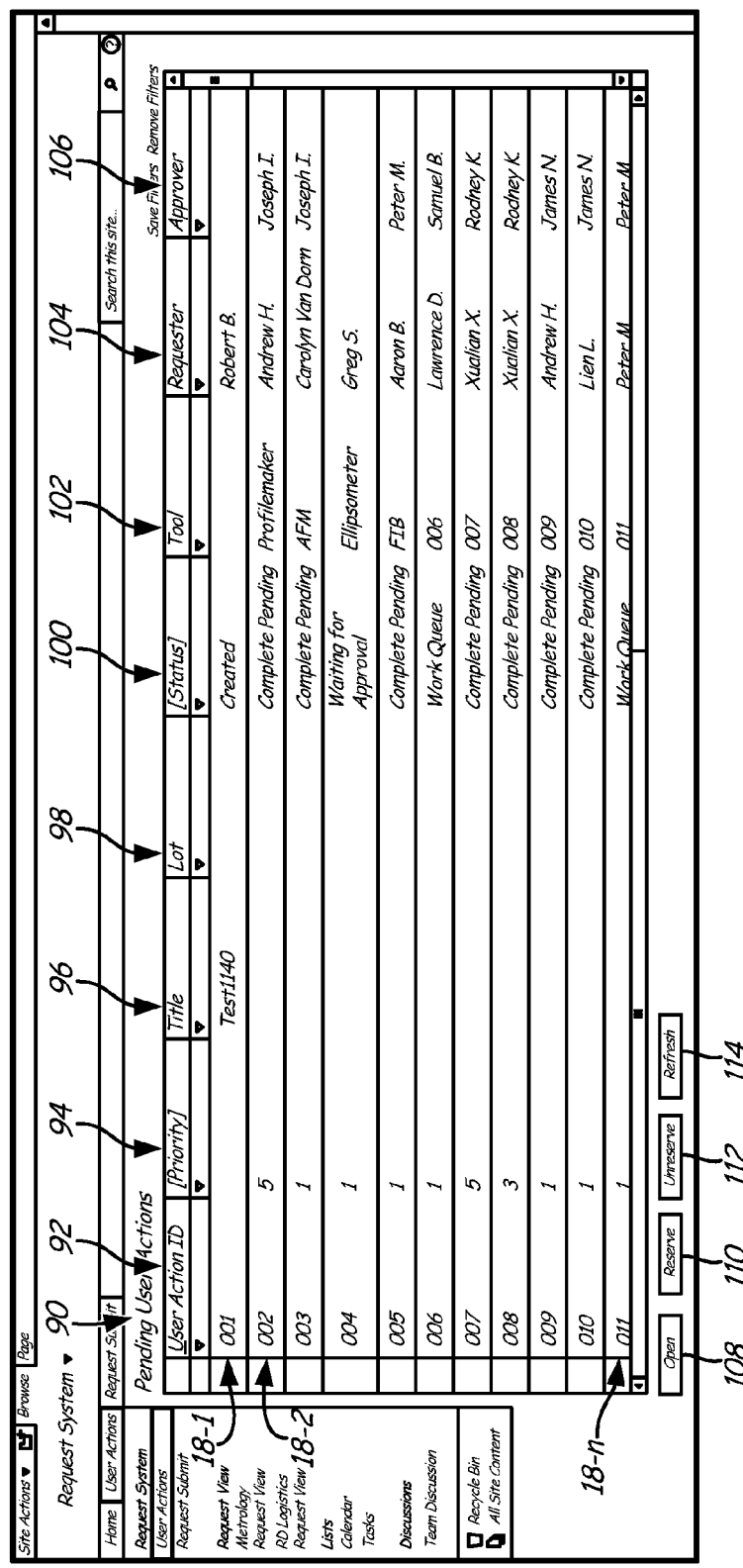
FIG. 6 is a screenshot of a pending user action window displayed to a user according to another embodiment of the present invention.

FIG. 6 is a screenshot of pending user actions displayed to a user in response to a request for pending user actions according to another embodiment of the present invention. In the embodiment shown in FIG. 6, pending user actions are displayed in pending user action window 90. Pending user actions are again displayed as records, with each user action provided in a separate row. In the example shown in FIG. 6, returned user actions include user actions 18-1, 18-2, . . . , 18-*n*. Each record includes identifying information with respect to the returned actions, including User Action ID 92, Priority Level 94, Title 96, Lot ID 98, Action Status 100, Equipment 102, Requester 104, and Approver 106. In addition, user actions may be sorted by any one of the provided categories.

User Action ID 92 identifies the user action by a particular number, while Title 96 describes the user action. Priority 94 indicates a priority level associated with the user action, and allows different user actions to receive different priority codes. The priority of a particular action may be indicated in the workflow plan in which the user action resides. For example, a critical error in a machine generates a user action with higher priority than a user action associated with routine maintenance. In this way, a user may sort user actions based on their assigned priorities.

In the embodiment shown in FIG. 6, Lot ID 98 and Tool 102 are also included in user action records. This information may be included and stored in pending user action database 42 at the time the user action is loaded in the database, based on information retrieved as part of the workflow plan. For example, in response to an event that triggers a particular workflow plan, one of the actions in the workflow plan may be to acquire lot identification information. The acquired information is included as part of a subsequent user action stored in pending user action database 42 and displayed to the user. Similarly, information identifying the tool or machinery at issue may be included as part of the user action record.

Status 100 identifies the current status of the workflow that issued the user action, and allows for various status identifies beyond 'completed' and 'not completed' to be incorporated into each user action. For example, status identifiers may include created, completed pending, waiting for approval, work queue, and others.

In some embodiments, workflows and/or user actions may be requested by another user of the system. Requestor field 104, if populated, indicates a user responsible for requesting the user action. Similarly, Approver field 106, if populated, indicates a user responsible for approval of performed user actions.

A benefit of the embodiment shown in FIG. 6, is it provides the user with additional information regarding available user actions, and allows the user to sort and organize pending user actions based on one or more of these fields.

"Open" button 108, "Reserve" button 110, "Unreserve" button 112, and "Refresh" button allow the user to interact with pending user actions list. "Open" button 108 allows a user to open a user action, to perform and complete the user action. "Reserve" button 110 allows a user to reserve one or more user actions (i.e., assign the user action to the user in the pending user action database). "Unreserve" button 112 allows a user to remove a previously reserved user action from the user in the pending user action database. "Refresh" button 114 refreshes the list of pending user actions for the current user.

Figure 7A:
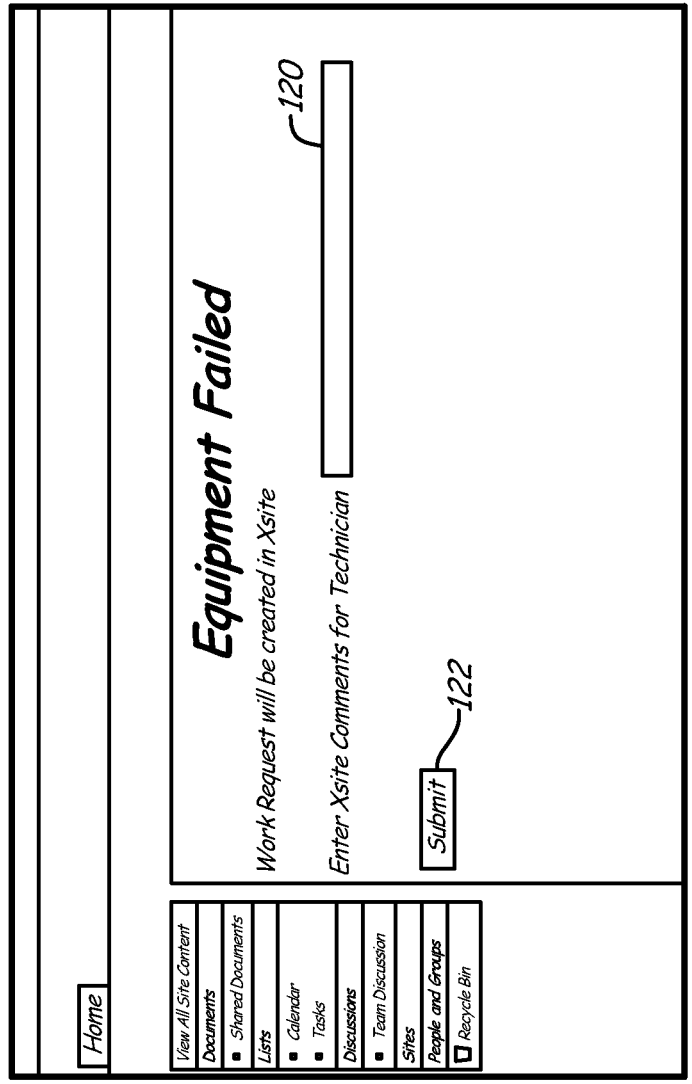
FIGS. 7A and 7B are screenshots of user action windows displayed to a user according to embodiments of the present invention.
Figure 7B:
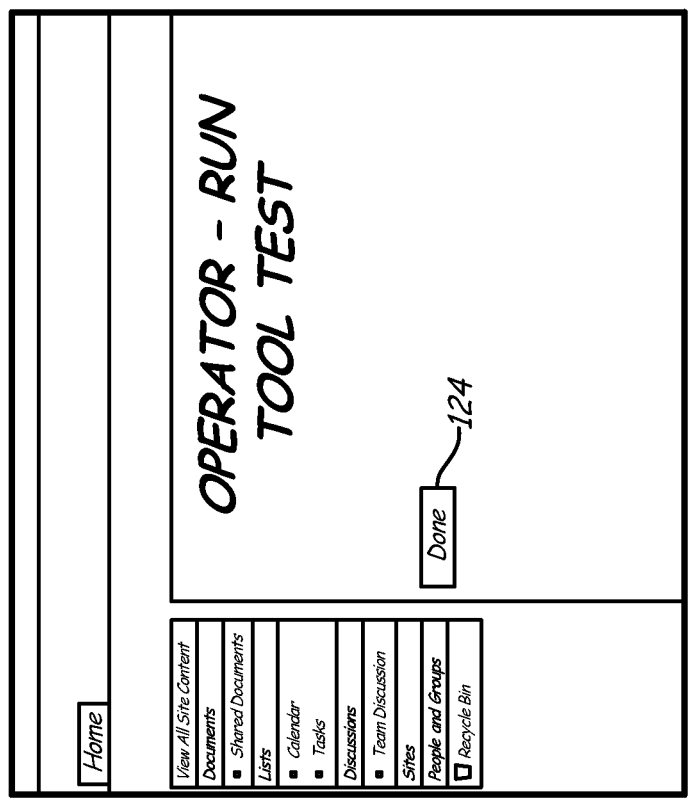

FIGS. 7A and 7B are screenshots of user actions displayed to a user according to an embodiment of the present invention. In the embodiment shown in FIG. 7A, the user action requests a user to provide comments for a technician via text entry field 120. The user completes the action by clicking submit button 122. Text entered by the user is communicated to the workflow management system as an output of the user action, which uses the information provided by the user in the workflow being executed.

In the embodiment shown in FIG. 7B, the user action requests the user to perform a particular action (e.g., Run Tool test). In this example, after running the tool test, the user completes the user action by clicking done button 124. Completion of the user action is communicated to the workflow management system, which in response continues execution of the workflow that called the user action.

Figure 8:
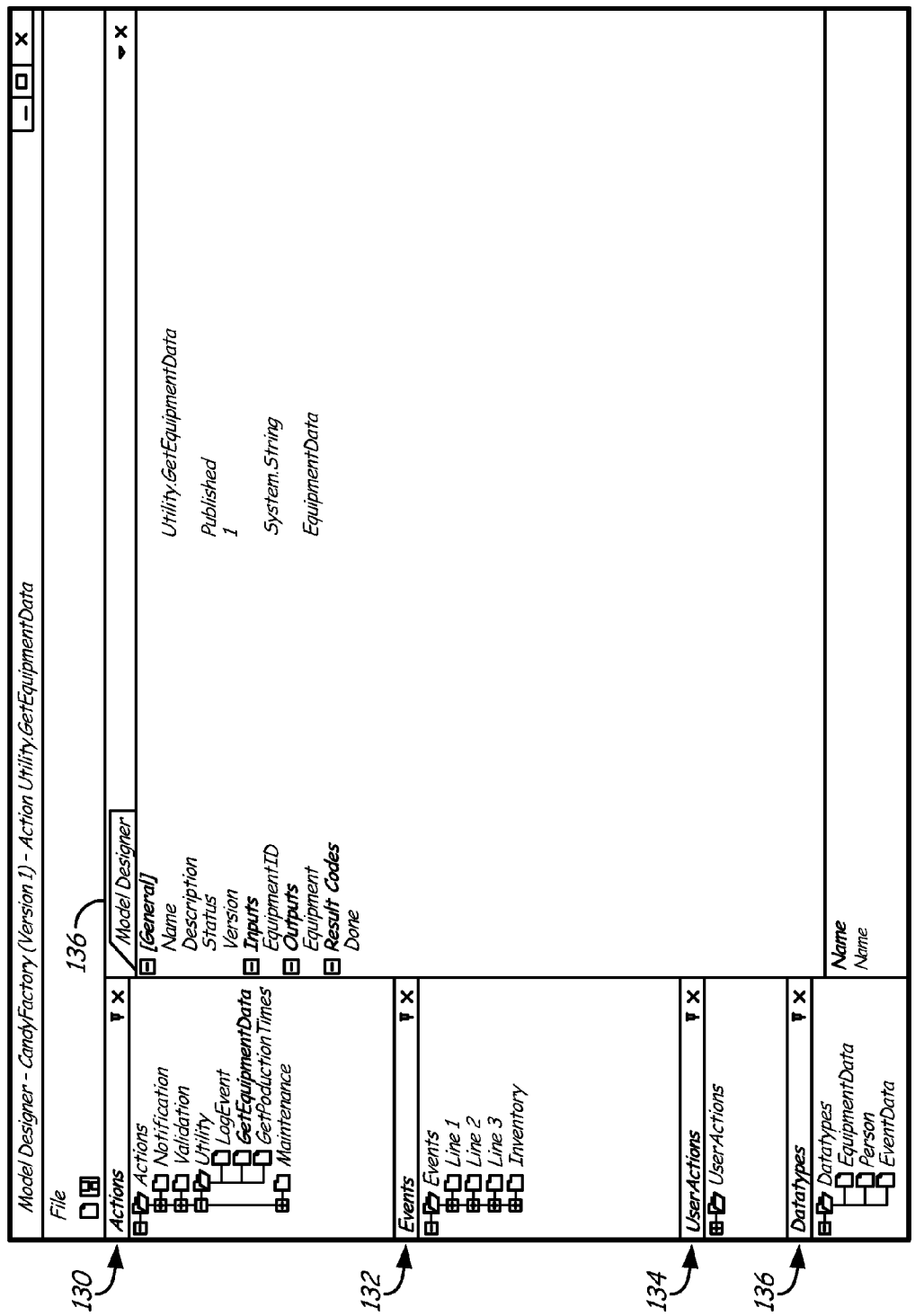
FIG. 8 is a screenshot of a model design tool window displayed to a user according to an embodiment of the present invention.

FIG. 8 is a screenshot from the model designer tool used by an architect to develop events, actions and user actions to be included in workflow plans. In the embodiment shown in FIG. 8, the interface displays action window 130, event window 132, user action window 134 and data type window 136. Action window 130 provides an interface that provides an organized view of actions created for inclusion in a particular model.

In the embodiment shown in FIG. 8, an architect has developed a number of user actions, organized by type, including notification actions, validation actions, utility actions and maintenance actions. In the screenshot illustrated in FIG. 8, the user has selected actions classified as utility actions, and in particular has selected an action titled 'GetEquipmentData'. Selecting this action display information about the action in workspace window 136, allows the user to define the operation of the action. For example, under the category 'General', the user is able to name the action, describe the action performed, indicates the status of the action (e.g., published, unpublished), and note the version.

In addition, the architect describes the operation of the action, allowing the user to define inputs, outputs and result codes associated with a particular action. The category 'Inputs' allows the user to identify inputs passed to the action, and the format of the inputs. The category 'Outputs' allows the user to identify outputs generated by the action when completed, while the category 'Result Codes' allows the user to identify the type of indication provided by the action when the action is complete (e.g., Done, Failed, Not Found, etc.). The result code is oftentimes used to select a next step performed in a workflow plan. For example, an action may have two result codes (e.g., yes and no), with the result code 'yes' being generated if a result of the action is true, and the result code 'no' being generated if a result of the action is false. In this way, workflow plans may be created that include if-then paths based on the output of various actions, user actions and data actions. The model designer interface similarly allows an architect to create events, user actions and data actions. Similar views are provided to allow a user to design and create events and user actions.

Figure 9:
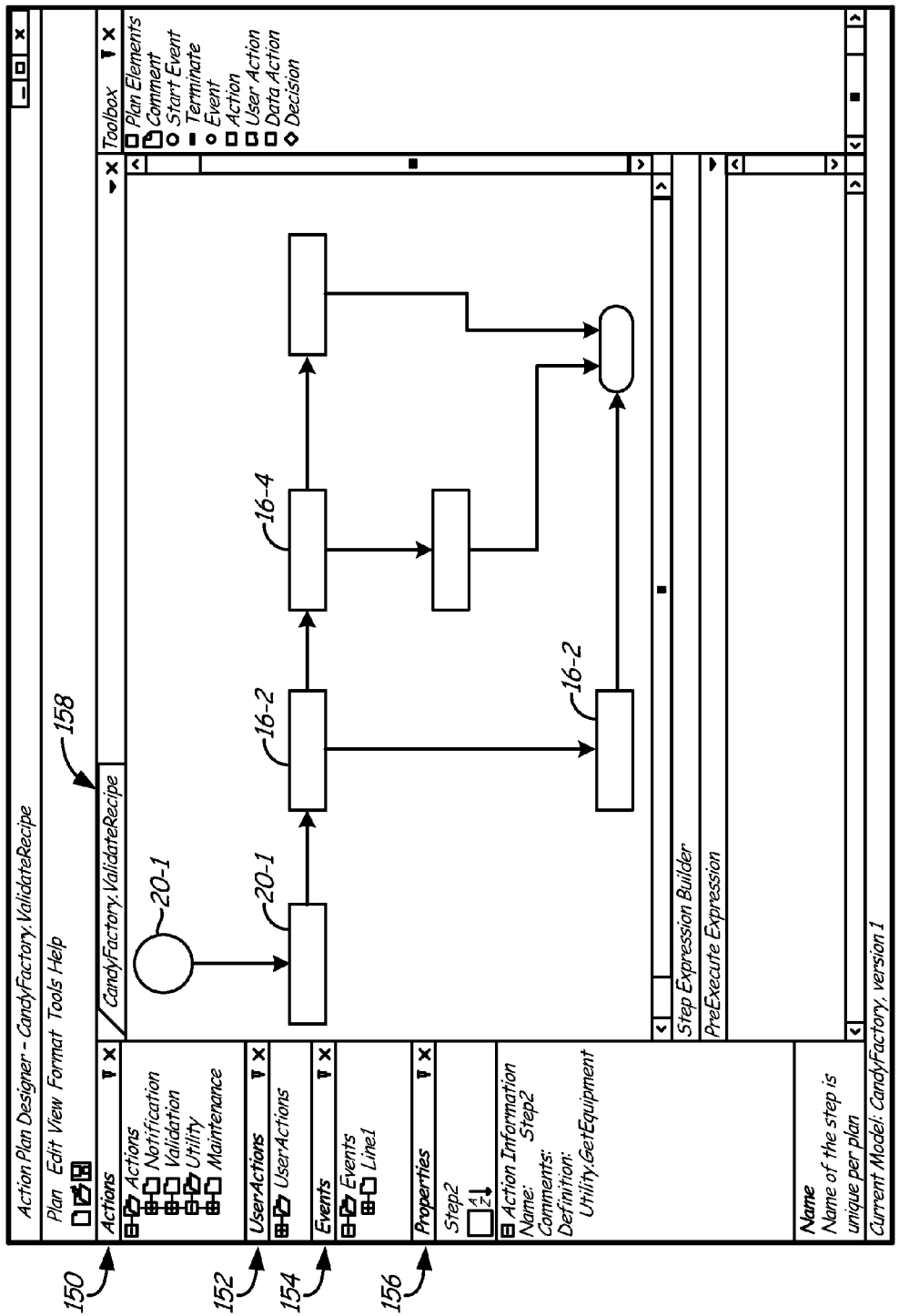
FIG. 9 is a screenshot of a workflow design tool window displayed to a user according to an embodiment of the present invention.

FIG. 9 is a screenshot from the workflow designer tool used by a developer to create workflows plans. The interface for the workflow designer tool includes action window 150, user action window 152, event window 154, and properties window 156. Workspace window 158 allows a developer to create a workflow by dragging and dropping events, user actions and events into the workspace and connecting them together in a sequential manner (i.e., workflow). In the embodiment shown in FIG. 9, lines connecting each action to a subsequent action (or user action, data action), includes the result code that must be received by the plan engine before flow is allowed to continue. For example, a result code of 'Done' is provided between actions 16-1 and 16-2, indicating that action 16-1 has to generate a result code 'Done' before the plan engine will proceed to executing action 16-2. With respect to action 16-2, the action generates a result code of either 'yes' or 'no', depending on the outcome of the action. If a result code of 'no' is generated, then the plan engine would proceed with processing action 16-3, but would not process action 16-4. Conversely, if a result code of 'yes' is generated, then the plan engine would proceed with processing action 16-4, but would not process action 16-3. In this way, a developer uses the workflow designer tool to create a workflow plan from the various actions, user actions, events and data actions defined by the architect using the model designer tool.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A workflow management system comprising:
    a database for storing one or more workflow plans, at least one workflow plan consisting of a plurality of events, actions, and/or user actions, wherein dataflow branching within the at least one workflow plan is defined by results codes returned by each event, action, and/or user action during execution of the workflow plan;
    an event engine, executed by one or more processors, that monitors events generated by external systems and/or users connected to the workflow management system and selects one or more of the stored workflow plans for execution based on monitored events;
    a plan engine, executed by the one or more processors, for executing a workflow plan that includes user actions to be performed asynchronously by a user as part of the workflow plan and at least one event, or action to be performed automatically, wherein the plan engine utilizes result codes returned by each event, action, and/or user action to determine dataflow branching within the at least one workflow plan, and wherein the plan engine stores outputs provided by executed events, actions, and/or user actions;
    a pending user action database that stores pending user actions added to the database in response to execution of the workflow plan that includes user actions, and removes pending user actions from the database in response to a user completing a user action; and
    a portal engine that communicates with the plan engine and a user via an external user interface, wherein the portal engine receives requests for pending user actions from the user, provides pending user actions retrieved from the pending user action database in response to a received request, and receives completed user actions from the user via the external user interface.

2. The workflow management system of claim 1, further including:
    a database for storing one or more models, each model including definitions of a plurality of events, actions and user actions included as part of the model and implementation details associated with each of the plurality of events, actions and user actions, wherein definitions of the events, actions and user actions describe external communication of the events, actions and user actions, wherein the implementation details describe internal operations of the events, actions and user actions.

3. The workflow management system of claim 2, wherein a plurality of implementations may be included in the model for each of the events, actions and user actions defined in the model.

4. The workflow management system of claim 1, wherein in response to a request for pending user actions, the pending user action database returns all pending user actions assigned to the user making the request.

5. The workflow management system of claim 1, wherein in response to a request for pending user actions, the pending user action database returns all pending user actions matching credentials associated with the user making the request.

6. The workflow management system of claim 1, wherein the plan engine adds a pending user action to the pending user action database as part of the execution of the workflow plan, wherein execution of subsequent steps of the workflow plan continue only after the plan engine receives notification that the pending user action has been completed.

7. The workflow management system of claim 1, wherein the plan engine removes a pending user action from the pending user action database when notification is received that the pending user action has been completed.

8. The workflow management system of claim 1, further including: a workflow execution history database that stores records regarding the execution of user actions, including identification of the user action completed and identification of the user performing the user action.

9. The workflow management system of claim 8, wherein the plan engine stores partially executed workflow plans to the workflow execution history database and loads the partially executed workflow plans into the plan engine in response to occurrence of an event, completion of an action, user action, or other element in the workflow plan.

10. The workflow management system of claim 1, further including: an action engine that communicates with external systems to implement actions called by the execution of the workflow plan by the plan engine.

11. The workflow management system of claim 1, wherein the plan engine may execute multiple instances of a workflow plan.

12. A computer-implemented method of providing workflow management in a distributed system, the method comprising:

loading into a plan engine for execution a workflow plan, the workflow plan being comprised of a plurality of actions and user actions organized into a plurality of dataflow paths, wherein branching between dataflow paths is defined by result codes returned by each of the plurality of actions and user actions during execution, wherein based on the loaded workflow plan, the plan engine manages and maintains sequential, asynchronous execution of actions and user actions provided in the selected workflow plan based on result codes provided by each action and/or user action;

adding a user action provided in the executed workflow plan to a pending user action database;

receiving a request for pending user actions from a particular user; retrieving pending user actions from the pending user action database based on the particular user making the request;

delivering retrieved pending user actions to the user for review;

removing pending user actions from the user action database in response to completion of the user action by the particular user; and storing outputs provided by executed actions and user actions.

13. The computer-implemented method of claim 12, further including:

receiving an event notification; selecting a workflow plan from a plurality of workflow plans stored in a database for execution based on the received event; and loading the selected workflow plan into the plan engine that manages execution of the selected workflow plan.

14. The computer-implemented method of claim 12, wherein retrieving pending user actions from the pending user action database based on the particular user making the request includes:

retrieving credentials associated with the user from a user directory server; and retrieving user actions from the pending user action database based, in addition, on the retrieved credentials associated with the user.

15. The computer-implemented method of claim 12, further including:

receiving from the user identification of pending user actions for which the user will be responsible; and updating the pending user action database based on received identification of pending user actions for which the user will be responsible to prevent these user actions from being displayed to other users as pending.

16. A distributed communication system comprising:

a system interface that is connectable to communicate with an external system;

a user interface for displaying and receiving input from a user;

a workflow management system connected via a network to the system interface and the user interface, the workflow management system comprising:

a database that stores a model and one or more workflow plans, wherein the model defines as actions those interactions between the system interface and the external system, and as user actions those interactions between the user interface and the user, wherein the one or more workflow plans consists of individual instances of actions and user actions defined in the model, organized into dataflow paths, wherein branching between dataflow paths is defined by result codes returned by each instance of action and user action during execution;

an event engine, executed by one or more processors, that receives event notifications from the system interface and/or the user interface, wherein in response to a received event notification the event engine selects one or more of the workflow plans stored in the database for execution;

a plan engine, executed by the one or more processors, that loads the one or more workflow plans selected for execution and selects branching between dataflow paths based on a result code returned by each instance of actions and/or user actions during execution, wherein the plan engine also stores outputs provided by actions and/or user actions;

an action engine that communicates with the plan engine to execute actions provided in the workflow plan executed by the plan engine;

a pending user action database that communicates with the plan engine to store user actions provided in the workflow plan executed by the plan engine until indication is received by the plan engine that the user action has been completed; and a portal engine, executed by the one or more processors, that communicates with the plan engine, the pending user action database and the user interface to display to a user a list of pending user actions, receive input from the user regarding the pending user actions to be assigned to the user, and provide completed user actions to the plan engine.

17. The distributed communication system of claim 16, wherein the model further includes implementation details with respect to each of the actions and user actions.

18. The distributed communication system of claim 17, wherein each of the plurality of actions and user actions defined in the model may include a plurality of different implementations, each different implementation of a particular action or user action identified by a label.

19. The distributed communication system of claim 16, wherein the plan engine may execute a plurality of instances of a workflow plan.

20. The distributed communication system of claim 16, wherein the display provided by the portal engine allows the user to select user actions for completion and reserve user actions for subsequent completion.

21. The distributed communication system of claim 16, wherein pending user actions displayed to a user based on identity of the user and credentials associated with the user.

* * * * *